Aug. 8, 1950  R. B. RANSOM  2,517,926
FISHING REEL
Filed Feb. 14, 1948
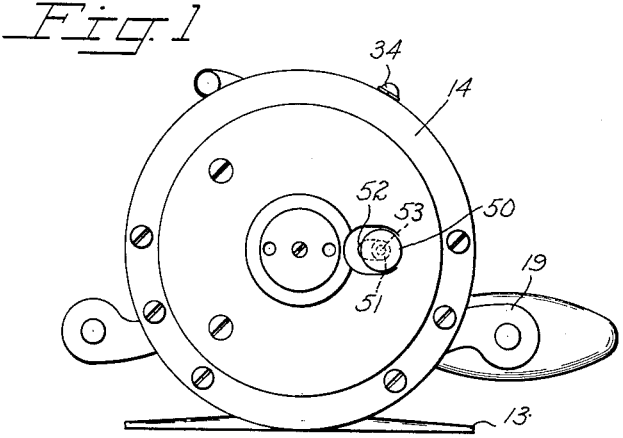
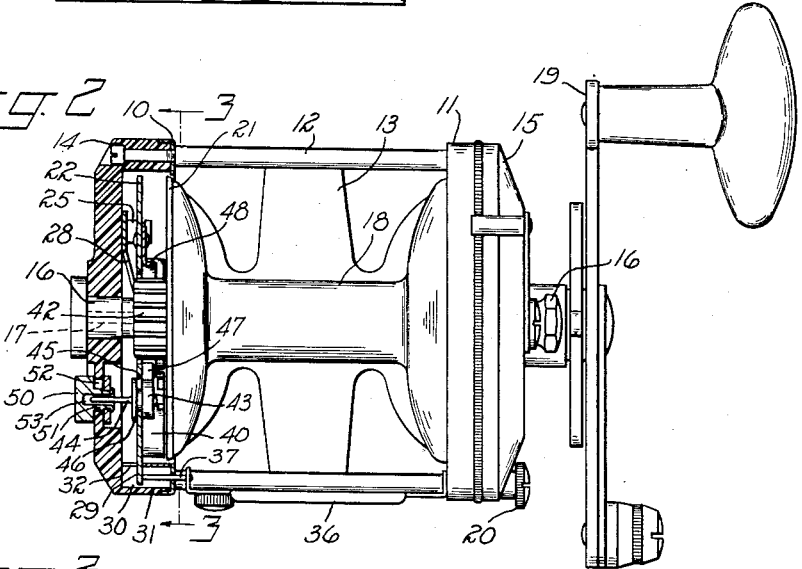
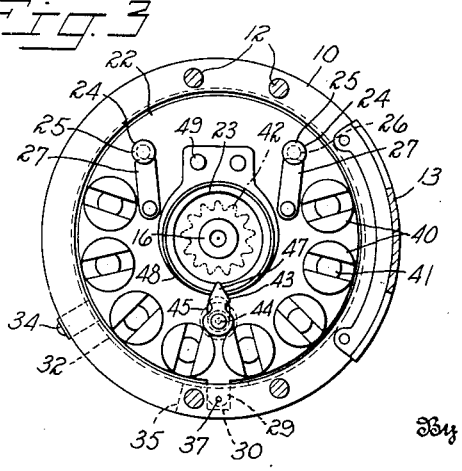
Inventor
ROBERT B. RANSOM
By T. Clay Lindsey.
Attorney Patented Aug. 8, 1950

2,517,926

UNITED STATES PATENT OFFICE 2,517,926

FISHING REEL

Robert B. Ransom, Hamden, Conn.

Application February 14, 1948, Serial No. 8,420

3 Claims. (Cl. 242—84.6)

The present invention relates generally to fishing reels and has particular application to a fishing reel of the type disclosed in my prior Patent No. 2,361,239, dated October 24, 1944, and in my co-pending application Serial No. 618,272, filed September 24, 1945.

The present invention is concerned with the problem of providing a click mechanism in fishing reels of the eddy current brake type where the fishing reel is constructed and arranged for easy and rapid "take down," that is, assembly and disassembly, and where the reel is provided at the end opposite from the winding mechanism with devices including a movable plate which can be adjustably positioned in order to regulate the eddy current brake and which is adapted to be removed or detached at will in an easy and simple manner from the device.

It is an object of the invention to provide a click mechanism in fishing reels of the character described which will not interfere in any way with the normal operation of the reel or the eddy current brake mechanism and which, at the same time, will not interfere in any way with the take-down features of the reel.

A further object of the invention is to provide a click mechanism of the type referred to which will be of sturdy and rugged construction so as to remain serviceable and operate satisfactorily over long periods of time.

A further object of the invention is to provide such a click mechanism which will require a minimum of parts, which will be relatively easy to fabricate and assemble, and which will not add unduly to the cost of the finished reel.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawing—

Figure 1 is an end elevational view of an assembled reel embodying the present invention;

Fig. 2 is a top plan view of the reel with parts broken away and shown in cross section in the interest of clearness; and Fig. 3 is a sectional view through one end of the reel, this view being taken substantially on line 3—3 of Fig. 2 and looking in the direction of the arrows.

Referring to the drawing in detail, the reel is shown as having a frame comprising rings 10 and 11 which are held in spaced apart relation by the pillars 12 and the saddle member 13, the latter being utilized for attaching the reel to the handle of a fishing pole in the usual manner. The ends of the frame are enclosed by end plates 14 and 15 preferably made of plastic material and detachably secured to the rings 10 and 11 respectively. Supported in suitable bearings 16 provided in the end plates is a spindle 17 to which is secured a spool 18. The spindle, together with the spool, may be manually rotated as desired by a crank 19 operating through a gear mechanism, not shown. For quick take down, the screw 20 may be turned to release the end plate 15 from the ring 11 whereupon the end plate 15, crank 19 and gear mechanism may be removed as a unit. Following the removal of this unit, the spool 18 and spindle 17 assembly may then be removed as a body outwardly through the ring 11.

The eddy current brake mechanism and the click mechanism of the present invention are found between the end plate 14 and the end of the spool 18 as shown in detail in Figs. 2 and 3 and which will be particularly described hereinafter. A main element of the eddy current brake is a damping unit 21 which comprises a ring of non-magnetic material, such as copper, which is fixed to the end of the spool 18 so as to rotate therewith.

The damping unit 21 is spaced from the end plate 14 a sufficient distance to permit the positioning therebetween of a magnet positioning plate 22. The magnet positioning plate 22 is provided with a central opening 23 through which may extend the end of the spindle 17 so that the latter may be journaled in the bearing 16 as previously mentioned. The plate 22 is adapted to be secured to the end plate 14 so that it may be pivoted toward and away from the end of the spool 18. In the specific embodiment shown in the drawing, this has been accomplished by providing a pair of openings 24 permitting the plate to be slipped onto a pair of corresponding pins secured to the end plate 14. The ends of the pins 25 are formed with an annular groove 26 to receive the ends of pivoted arms 27 fixed to the plate 22. As will be readily apparent, in disassembling the device, arms 27 can be pivoted away from the pins 25 to disengage the ends of the arms 27 from the grooves 26 thereby permitting the plate 22 to be removed from the reel. When the pivoted arms 27 are in engagement with the grooves 26, there is formed a loose connection in the sense that the plate 22 may be pivoted on the ends of the pins 25.

The portion of the plate 22 opposite from the pins 25 is resiliently urged toward the spool 18 by spring arms 28 which press inwardly against the plate 22 adjacent the midpoint and on opposite sides of the central opening 23. The end of the plate 22 opposite from the pivot point is also provided with a nib 29 which is engaged in a slot 30 in the flange 31 of the end plate 14. Associated with the slot 30 is a slide 32 having an internal inclined camming surface (not shown). The slide 32 is adapted to be moved along the inner surface of the flange 31 by means of an outwardly protruding pin 34 adapted to be moved in a slot 35. As will be apparent, when the pin 34 is moved to one extreme of its travel, the camming surface of the slide 32 will press the nib 21 outwardly to the full extent thereby pivoting the plate 22 away from the spool 18. Then as the pin 34 is moved to the opposite extreme of its travel, the camming surface permits a gradual pivoting of the plate 22 inwardly toward the spool 18 under the influence of the spring 28. Instead of utilizing the pin 34, if desired, the user of the reel may pivot the plate 22 outwardly away from the spool 18 by pressing outwardly on a slide 36 which has connected thereto a pin 37 which extends through the ring 10 so as to press against the nib 29.

The plate 22, as previously mentioned, is utilized as a magnet positioning member and is provided with a plurality of magnets 40 composed of highly coercive force permanent magnet material. These magnets are circularly disposed about the axis of the spindle and, while the magnets may be variously arranged, they are shown in the specific embodiment as spaced appreciably apart with unlike poles adjacent. In the specific embodiment, each magnet is of circular form and is diametrically grooved at one end so as to form two poles. The magnets may be secured to the plate 22 in any suitable manner as by rivets 41.

The foregoing description is given merely by way of background and setting for the present invention and the elements described and combinations thereof are claimed in my earlier patent and co-pending application previously referred to. The present invention is more particularly directed to the provision of a click mechanism for a reel of the type described, which click mechanism will not interfere in any way with the operation of the reel and eddy current brake and which will not interfere with the take-down features of the device.

In accordance with the present invention, the central opening 23 is made sufficiently large so as to receive a pinion 42 which is secured to the spindle 17 so as to rotate therewith. The pinion 42 is sufficiently wide so that it will be operable when the plate 22 is pivoted through its full range as previously described. In the interests of saving space, the pinion 42 may be counterbored to permit it to partially slip over the end of the bearing 16. The click mechanism, other than the pinion 42 and the operating means, is fastened on the movable plate 22. This portion of the click mechanism comprises a click 43 which is fixed to a pin 44 which is rotatably and slidably received through the radial notch 45 in the plate 22. The pin 44 is provided with a flange 46 which, together with the click 43, prevents detachment of the click from the plate 22 without interfering with the sliding and pivotal engagement with the surfaces adjacent the notch 45.

The click 43 is provided with a generally triangularly shaped head 47 which is received between the ends of a bifurcated spring member 48 which extends around each side of the opening 23 and which is secured to the plate 22 in any suitable manner such as the rivets 49. When the click 43 is moved inwardly to the full extent of its travel when the reel is assembled, the head 47 of the click will engage the teeth of the pinion 42. When the click 43 is moved outwardly to the full extent of its travel, however, the head 47 will be withdrawn from the pinion 42. As will be apparent, the bifurcated spring member 48 will resiliently hold the click 43 in either the engaged or disengaged position, this by reason of the fact that the widest point of the head 47 will act to force apart the spring 48 the greatest amount intermediate these two positions. Also, when the click is moved to the engaging position, the bifurcated ends of the spring member 48 will resiliently hold the click in a radial position. Therefore, as the spool 18 is rotated, which also causes rotation of the pinion 42, the head 47 of the click 43 will be periodically engaged by the teeth of the pinion 42 causing the click 43 to pivot against the spring 48 and, as the tooth of the pinion moves past the click 43, the click will be released and returned to original position with an audible clicking noise. These particular elements of a click mechanism have been utilized heretofore in fishing reels of a conventional type.

In order to move the click 43 between pinion engaging and disengaging positions, there is provided a button 50 having a portion 51 of reduced cross section which is received in a slot 52 in the end plate 14 which generally parallels the notch 45 of the click mechanism. The button 50 is adapted to be slid radially such as by the thumb of the operator. In order to permit the click 43 to be operated by the button 50 without interfering with the pivoting movements of the magnet positioning plate 22 or with the take down of the reel, there is provided a detachable telescoping connection between the button 50 and the pin 44. In the simplest embodiment, this includes merely an axial bore 53 in the button 50 which is of slightly greater diameter than the pin 44 so as to permit some play therebetween and the lengths of the pin 44 and the bore 53 are so proportioned that a satisfactory driving connection is obtained when the magnet positioning plate 22 is pivoted inwardly to the full extent toward the spool 18 and which, at the same time, does not interfere with the full pivoting movement of the plate 22 outwardly away from the spool 18.

As a result of the above construction, a desired click mechanism is provided in a fishing reel of the eddy current brake type which does not interfere with the positioning of the parts required to provide the eddy current brake, which does not interfere with the operation of the eddy current brake elements, and which does not interfere with the take down or disassembly of the reel. The fabrication and assembly of the click mechanism is relatively simple and inexpensive and does not materially add to the cost of the reel. At the same time, the mechanism is sufficiently rugged and so constructed that it will operate satisfactorily over long periods of time without repair or replacement.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim as my invention:

1. In a fishing reel of the type provided with an eddy current brake and including a frame, a spool member mounted on a shaft, end plates on the frame providing journals for the ends of the shaft, one of said end plates forming a housing for the eddy current brake elements, a magnet positioning plate having a central opening through which the spool shaft extends, and means for mounting the magnet plate in said housing for movement toward and away from the spool, the combination therewith of a click mechanism comprising a pinion fixed to the spool shaft for rotation with the shaft adjacent the magnet plate opening, a click pivotally mounted on the magnet plate and slidable into and out of pinion engaging position, spring means yieldably retaining said click in substantially radial position with respect to the pinion, a control slide on the end plate, and a detachable telescoping connection between the click and the slide.

2. In a fishing reel of the type provided with an eddy current brake and including a frame, a spool member mounted on a shaft, end members on the frame providing journals for the ends of the shafts, one of said end members forming a housing for the eddy current brake elements, a positioning plate for elements of the eddy current brake having a central opening through which the spool shaft extends, and means for mounting the plate for movement toward and away from the spool, the combination therewith of a click mechanism comprising a pinion fixed to the spool shaft for rotation with the shaft adjacent the plate opening, a pin extending through a radial slot in said plate, a click mounted on said pin so as to be slidable therewith into and out of pinion engaging position, spring means yieldingly resisting pivoting movement of said click and operable for yieldingly retaining the click in or out of pinion engaging position, a button slidably mounted on said one end member for sliding movement generally parallel to movement of the click into and out of pinion engaging position, and means on the button for releasably and telescopically receiving the end of the pin whereby the click may be positioned by the button and whereby movement and removal of the plate is permitted.

3. In a fishing reel of the eddy current brake type, the combination comprising a housing, a shaft journaled at one end in said housing, a spool mounted on the shaft, a magnet positioning plate having a central opening through which said shaft extends and pivotally mounted in said housing for movement toward and away from the spool, means biasing the plate toward the spool, means for adjustably pivoting the plate away from the spool, a pinion on the shaft adjacent the plate opening, a click slidably mounted on the plate for movement into and out of pinion engaging position, a slide extending exteriorly of the housing and mounted for sliding movement generally parallel to movement of the click into and out of pinion engaging position, and means forming a axially detachable and adjustable connection between the slide and the click.

ROBERT B. RANSOM.

REFERENCES CITED

The following references are of record in the file of this patent:

UNITED STATES PATENTS

| Number | Name | Date |
|---|---|---|
| 2,361,239 | Ransom | Oct. 24, 1944 |